Nov. 9, 1937.   G. L. BARNES   2,098,929
BLOCK OR SLAB MOLDING MEANS AND METHOD
Filed Aug. 11, 1936   3 Sheets-Sheet 1
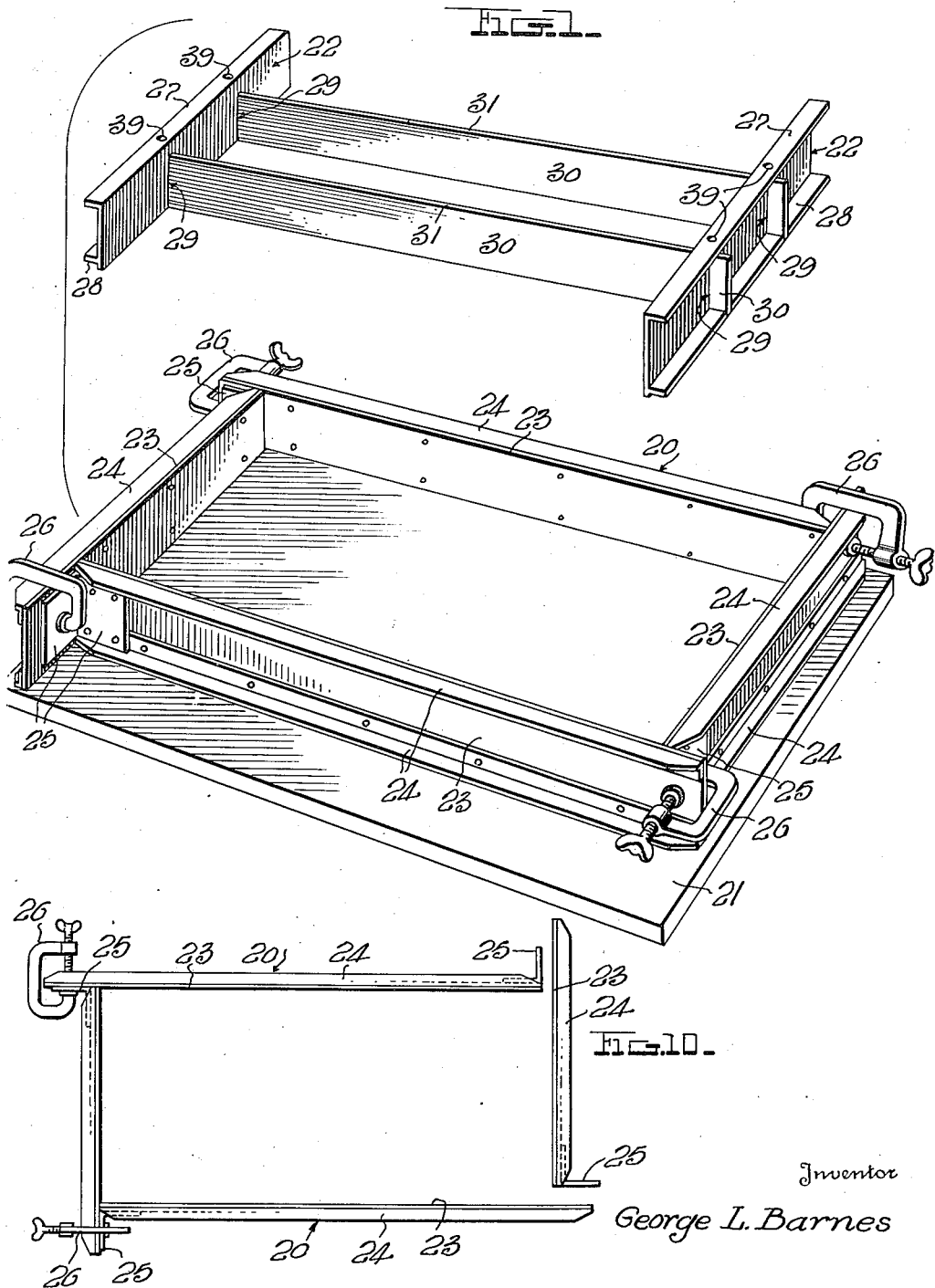
Inventor
George L. Barnes
By H. O. Willson &co.
Attorneys

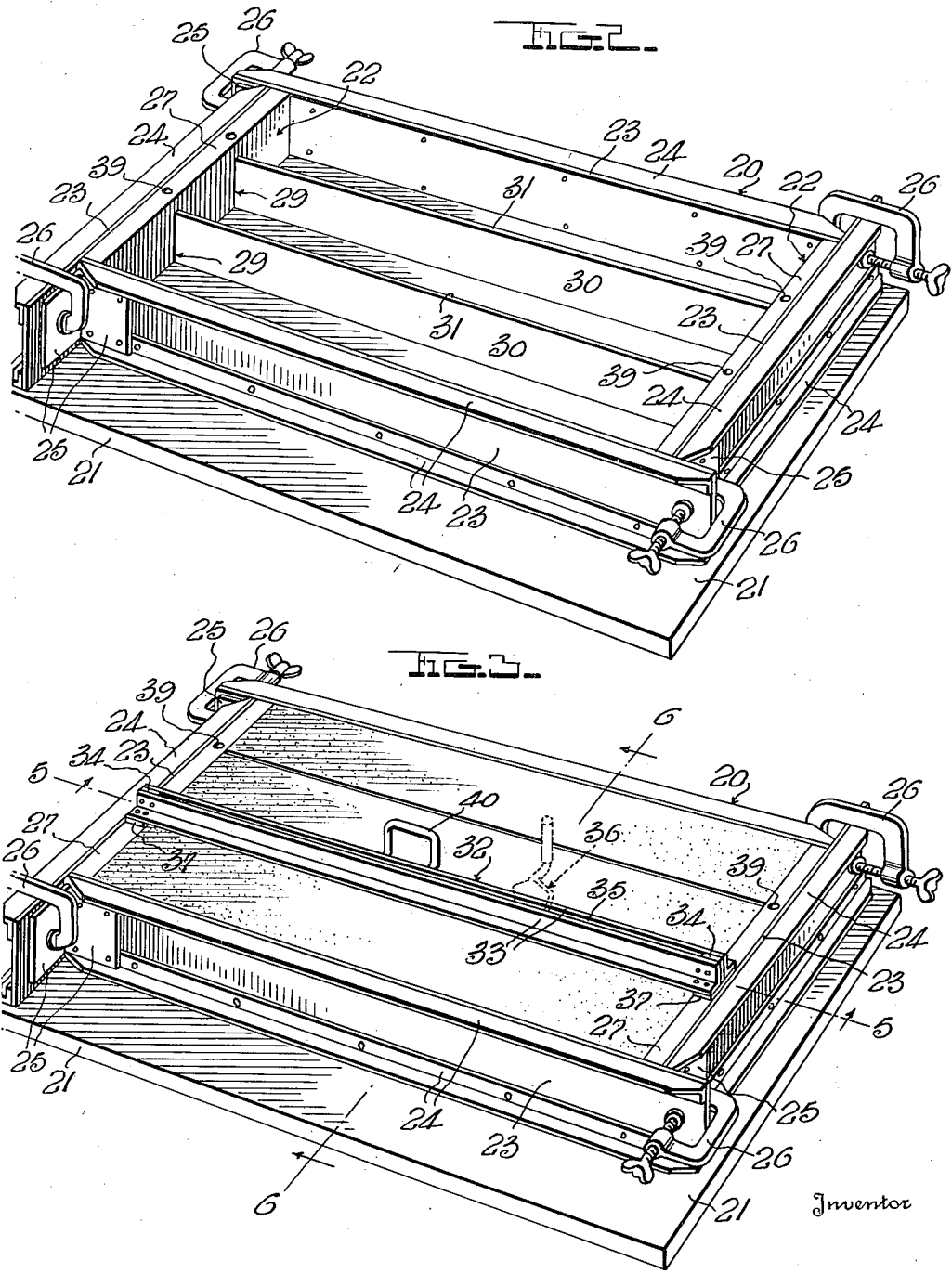

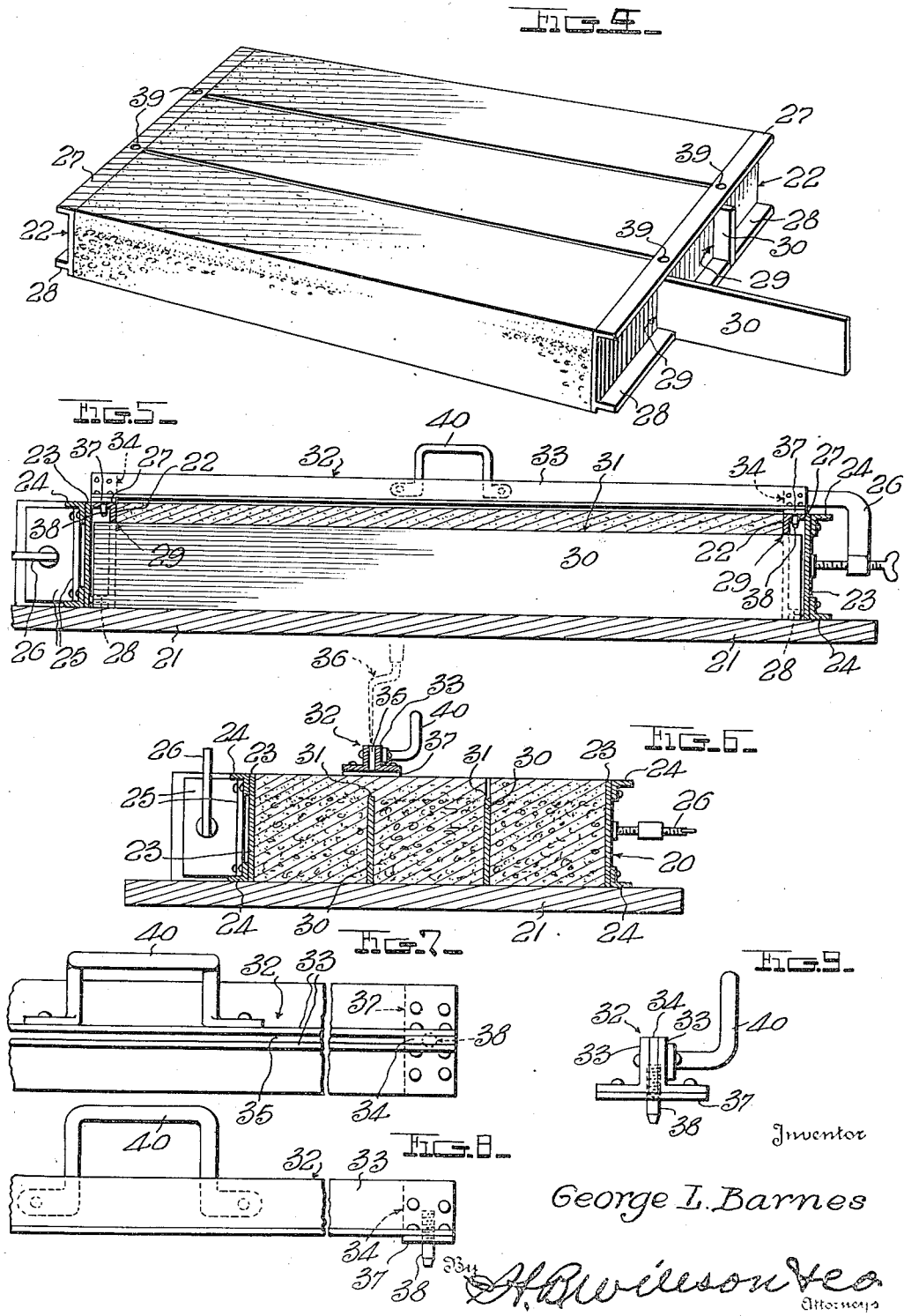

Patented Nov. 9, 1937

2,098,929

UNITED STATES PATENT OFFICE 2,098,929

BLOCK OR SLAB MOLDING MEANS AND METHOD

George L. Barnes, Terre Haute, Ind.

Application August 11, 1936, Serial No. 95,457

7 Claims. (Cl. 25—121)

The invention relates to a new and improved mold and method to mold concrete slabs or blocks, principally to take the place of brick, natural stone, or other building material for veneering buildings or walls.

One object of the invention is to provide for rapidly and economically forming a plurality of blocks or slabs at one operation.

Another object of the invention is to provide a novel mold and method for forming the finished blocks or slabs with straight clean-cut edges.

Yet another object is to make novel provision whereby the thickness of the concrete used for the major portions of the blocks or slabs and the thickness of the facing material applied thereto (usually colored) will be substantially uniform on all of the blocks or slabs, and by which the finishing material for all of the blocks or slabs being formed in the mold at one time, may be applied over the entire surface at one operation instead of being individually applied to the separate blocks or slabs, the facing material being then cut downwardly to and along the upper edge of each partition used in separating the concrete for the individual blocks or slabs.

With the foregoing and minor objects in view, the invention resides in the novel subject matter hereinafter described and claimed, description being accomplished by reference to the accompanying drawings.

Fig. 1 is a disassembled perspective view.

Fig. 2 is an assembled perspective view showing the complete mold in readiness for operation.

Fig. 3 is a view similar to Fig. 2 but illustrating the mold filled with the material being molded and showing the manner of cutting the upper portions of the slabs apart.

Fig. 4 is a perspective view illustrating the manner in which the partition plates are withdrawn.

Figs. 5 and 6 are sectional views on lines 5—5 and 6—6 respectively of Fig. 3.

Fig. 7 is a fragmentary top plan view of the guide for the cutting tool.

Fig. 8 is a fragmentary side elevation of the guide shown in Fig. 7.

Fig. 9 is an end elevation of the guide illustrated in Figs. 7 and 8.

Fig. 10 is a partially disassembled top plan view of the marginal molding frame.

A sectional marginal molding frame 20 is provided to rest on a suitable pallet 21, and liner plates 22 are provided for two of the sections of said marginal molding frame, for a purpose to appear. Each section of the frame 20 may well comprise a vertical plate 23, reinforcing longitudinally extending angle bars 24 secured to the upper and lower portions of said plate, and a right angular bracket 25 secured to and projecting outwardly from one end of said plate. The several sections are assembled with the bracket 25 of any section abutting the plate 23 of the next adjacent section, and suitable clamps 26 are employed for clamping the sections together.

The liner plates 22 are preferably provided with upper and lower reinforcing flanges 27 and 28 whose free edges abut the mold plates 23, and said liner plates are formed with vertical slots 29 which open through their lower edges for holding the ends of vertical partition plates 30 in place. These partition plates are disposed in vertical planes and extend horizontally between the liner plates 22, and the upper edges 31 of said partition plates are spaced downwardly from the upper edges of the mold plates 23. One or more of the partition plates 30 may be employed according to the blocks or slabs to be constructed, and the liner plates 22 will be provided with slots 29 of sufficient number to hold the selected number of partition plates.

By having the upper edges 31 of the partition plates 30 below the upper edges of the marginal frame 20 and its liner plates 22, said marginal frame may be entirely filled with the material being molded and this material may be finished at one operation flush with the upper edge of said frame. Then, the molded material while still sufficiently green, may be cut down to and along the upper edges 31 of the partition plates 30, forming sharp clean edges for the blocks or slabs. To facilitate the cutting operation, I provide a guide 32 and make provision for accurately positioning said guide upon the marginal frame 20 directly over the upper edge 31 of any partition plate 29, the cutting tool being so guided by said guide 32 that it will accurately strike the partition plate edge. In the present showing, the guide 32 is composed of two parallel angle metal bars 33 spaced apart slightly at their ends by shims or the like 34 to which they may be riveted, forming a narrow slot 35 to receive a trowel or other cutting tool 36. The ends of the bars 33 are also preferably connected by plates 37 riveted thereto and I have shown these plates provided with downwardly projecting studs 38 which are receivable in openings 39 in the flanges 27 of the liner plates 22, said studs 38 and openings 39 serving to accurately position the guide 32 above any of the partition plates 29. 40 merely denotes a suitable handle for the guide 32.

After assembling the mold, cement concrete is tamped into said mold to a depth substantially equivalent to the height of the partition plates 30, and said plates offer little hindrance to the work. The facing material which is usually colored or tinted, is now spread on evenly with the top of the mold. This insures an even surface with greater speed than possible if the partition plates were even with the top of the mold. The guide 32 is now applied accurately over one or another of the partition plates and the facing is cut down to said plate, insuring straight clean-cut edges and accurate sizes when the pieces are separated. The mold and the method carried out with the aid of said mold, save time and cost in the manufacture of small blocks by producing a plurality in one operation, and all of the blocks will be accurately formed. These blocks, while intended primarily for veneering, may of course be used for other purposes, and any desired number and sizes of blocks may be made at one time, according to the number of partition plates used, it being understood that liner plates 22 having sufficient slots for holding the selected number of partition plates, are employed in each instance.

It will be seen from the foregoing that novel provision has been made for carrying out the objects of the invention, and while preferred features have been disclosed, variations may of course be made within the scope of the invention as claimed.

I claim:—

1. A mold comprising a marginal frame, at least one vertical partition plate extending across said frame, the upper edge of said partition plate being disposed below the upper edge of said frame, whereby the material being molded may extend over said upper edge of said partition plate, and means for accurately guiding a tool for cutting the material down to said edge of said partition plate for the purpose set forth.

2. A mold comprising a marginal frame, at least one vertical partition plate extending across said marginal frame, the upper edge of said partition plate being disposed below the upper edge of said marginal frame, whereby the material being molded may extend over said upper edge of said partition plate and may be cut down to this edge, a guide for a tool used for said cutting, and means whereby said guide may be accurately positioned to guide the tool to and along said upper edge of said partition plate.

3. A mold comprising a marginal frame, at least one vertical partition plate extending across said marginal frame, the upper edge of said partition plate being disposed below the upper edge of said marginal frame, whereby the material being molded may extend over said upper edge of said partition plate and may be cut down to this edge, a guide for a tool used for cutting, and coacting means on said guide and said marginal frame for accurately positioning said guide to guide the tool to and along said upper edge of said partition plate.

4. A mold comprising a sectional marginal frame having two opposed vertical liner plates, said liner plates each having at least one vertical slot, at least one vertical partition plate extending between said liner plates and having its ends held in the slots thereof, the upper edge of said partition plate being below the upper edge of said marginal frame, whereby the material being molded may extend over said upper edge of said partition plate and may be cut down to this upper edge, a guide for a tool used in said cutting, and coacting means on said liner plates and said guide for accurately positioning said guide to guide the tool to and along said upper edge of said partition plate.

5. A method of forming clean-edged blocks or slabs with the aid of an upwardly open mold having a vertical partition plate, comprising the steps of filling the mold to such an extent as to completely cover the upper edge of said partition plate, and cutting down through the material to and along said upper edge of said partition plate.

6. A method of forming clean-edged blocks or slabs with the aid of an upwardly open mold having a vertical partition plate, comprising the steps of filling the mold to such an extent as to completely cover the upper edge of said partition plate, accurately positioning a guide over and longitudinally of said upper edge of the partition plate, and cutting along said guide to cut down through the material to said upper edge of said partition plate.

7. The method of forming clean-edged faced concrete blocks or slabs with the aid of a marginal molding frame and a partition plate having its upper edge below the upper edge of said marginal frame, comprising the steps of tamping concrete into the mold to a depth substantially equivalent to the height of the partition plate, applying facing material to the tamped concrete and extending it over said upper edge of said partition plate, finishing said facing material, and cutting down through the finished facing material to and along said upper edge of said partition plate.

GEORGE L. BARNES.